Figure 1:
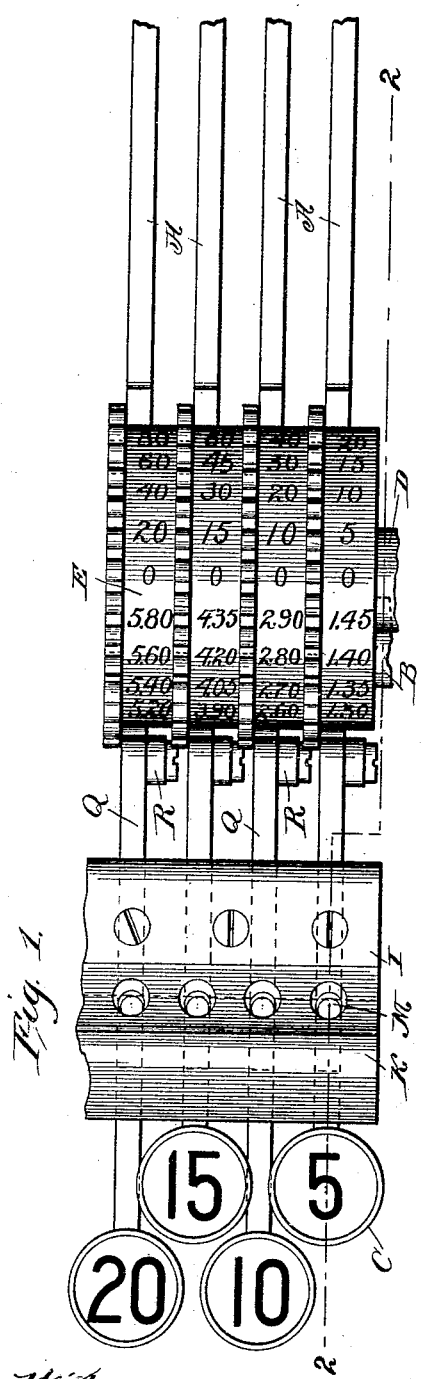

(No Model.)

G. W. GROVE.
CASH REGISTER.

No. 551,631. Patented Dec. 17, 1895.

Witnesses
Martin A. Olsen
John L. Tinison

Inventor
George W. Grove
by Edward Rector
his atty.

UNITED STATES PATENT OFFICE.

GEORGE W. GROVE, OF DAYTON, OHIO, ASSIGNOR TO THE NATIONAL CASH REGISTER COMPANY, OF SAME PLACE.

CASH-REGISTER.

SPECIFICATION forming part of Letters Patent No. 551,631, dated December 17, 1895.

Application filed July 11, 1892. Serial No. 439,664. (No model.)

*To all whom it may concern:*

Be it known that I, GEORGE W. GROVE, a citizen of the United States, residing at Dayton, in the county of Montgomery and State of Ohio, have invented certain new and useful Improvements in Cash-Registers, of which the following is a description, reference being had to the accompanying drawings, forming part of this specification.

My invention relates to that class of machines in which a series of operating-keys of different values are employed to actuate a registering mechanism and register their values; and it consists in the combination with such keys and registering mechanism of novel devices for punching tickets or checks.

My invention is especially designed for use in restaurants and like places where regular patrons are supplied with what are known as "commutation-tickets"—that is to say, tickets having printed upon them a series of numbers, or duplicate series of numbers, the tickets being sold to the customers for sums slightly less than the total of the numbers or amounts which are printed on them, and the customer being entitled to receive in return provisions or goods or the like to the full amount of the sum of the numbers printed upon the tickets.

Heretofore it has been the practice for the proprietor or cashier to cancel the numbers upon the tickets with an ordinary ticket-punch. The objection to this practice was that the proprietor, unless he wrote down the amount of every number canceled, could have no accurate knowledge of the amount outstanding against him upon the various tickets which he had sold. Thus if he had sold one hundred tickets in a given length of time, each ticket, for instance, representing a total value of one dollar and ten cents and being sold for one dollar, he would have no means of knowing at any time what portion of the numbers upon said tickets had been canceled and how much he was still indebted to their holders. It is the purpose of my invention to provide means for canceling the numbers upon said tickets and at the same time registering the amounts of the numbers canceled, so that by simply preserving a record of the number of tickets sold the proprietor can, at any time, by deducting from their total value the amount shown by the registering device, quickly and accurately ascertain the total amount outstanding against him. To that end I propose to provide the keys of a cash-register with punches by which the numbers upon such tickets may be canceled, and cause the amount canceled to be added upon the registering mechanism of the machine at the same operation.

It is now the practice in many cash-registers to divide the machine into a number of separate divisions for the purpose of separately registering the sales of different classes. Thus, in machines designed for drug-stores there are often three divisions, one series of keys and their registering mechanism being used to register sales of soda-water, another to register sales of cigars, and another to register sales of drugs or general merchandise. In a machine embodying my invention and designed for use in a restaurant, for instance, there will preferably be the usual series of keys and their registering mechanism for registering the cash received from customers, including cash received from the original sale of such tickets as those above mentioned. The machine will also contain a series of keys and a registering mechanism having my ticket-punches combined with them, for the purpose of canceling the numbers upon the tickets presented by customers. The numbers upon such tickets often run in multiples of five from five cents to twenty-five cents, the tickets sometimes being provided with a few numbers representing fifty cents. When a ticket is presented by a customer in payment for his purchase the proprietor or cashier punches out as many of the numbers as are necessary to equal the amount of the purchase.

In the accompanying drawings I have illustrated my invention as applied to a series of four keys, representing multiples of five, from "5" to "20," and combined with four separate registering-wheels.

Figure 2:
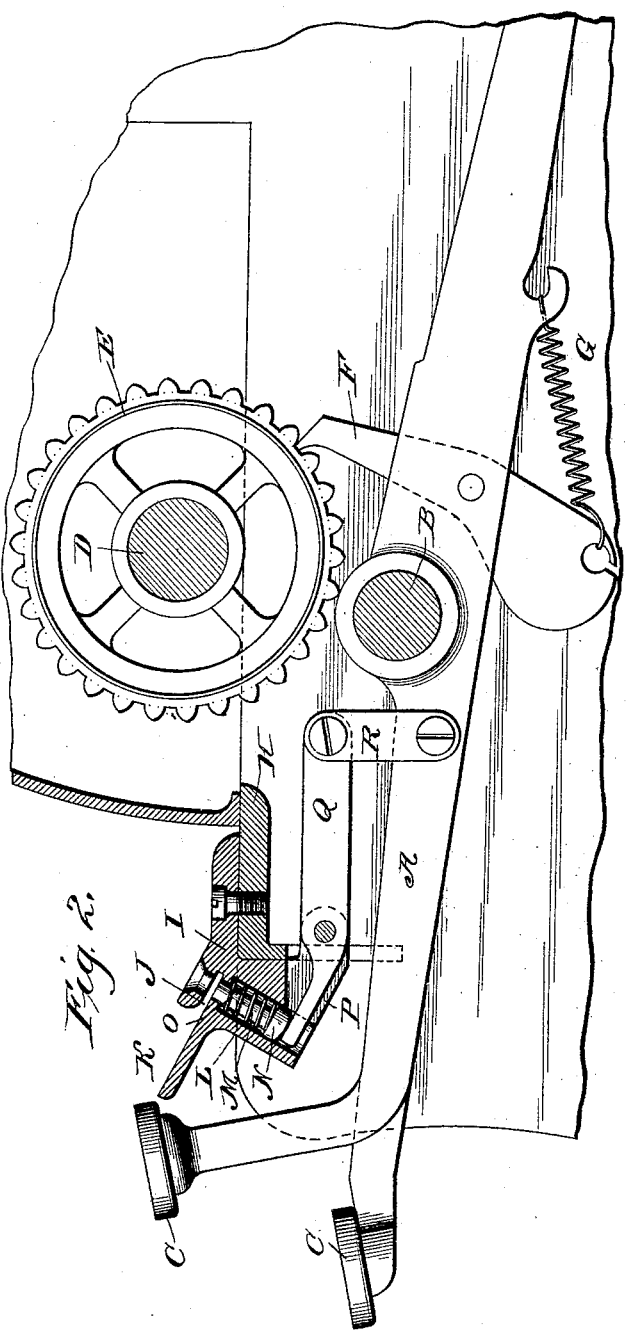

In said drawings, Figure 1 represents a top plan view of so much of a cash-register as is necessary to illustrate my invention, and Fig. 2 a vertical section of the same on the line 2 2 of Fig. 1.

The operating key-levers A are strung upon a horizontal shaft B and carry at their front ends numbered finger-buttons C representing their respective values. Loosely mounted upon a horizontal shaft D above and parallel with the shaft B are a series of four registering-wheels E, one for each of the operating-keys. Each of the latter has pivoted to it an actuating-pawl F, yieldingly held in engagement with the ratchet of the registering-wheel by a coiled spring G connected to the key-lever and to the lower end of the pawl. Upon depressing the front end of any key-lever to its limit of stroke its pawl F will turn the corresponding registering-wheel the space of one tooth, and when the key-lever is released and reset the pawl will slip back over the next tooth of the ratchet, suitable retaining devices (not shown) operating to permit forward but prevent backward movement of the registering-wheels in the usual manner. The periphery of each wheel bears a series of numbers in multiples of the amount represented by the key which actuates it, as seen in Fig. 1, so that the total amount registered by any key may be seen at a glance at the usual reading line or opening across the registering-wheels. This much of the machine is of familiar construction.

Secured upon a front cross-plate H of the framework is a plate or casting I provided with a transverse open slot J and a forwardly-projecting inclined shelf K. The under side of the plate I is provided with a series of bores L, in which are confined the punches M, whose enlarged heads N snugly fit in said bores and whose upper ends are adapted to pass through reduced openings between the bores and slot J and through coincident holes or dies in the portion of the plate I above said slot. Coiled springs O, surrounding the punches M and confined between their enlarged heads and the upper ends of the bores L, yieldingly hold the punches in and return them to normal position. Pivoted to brackets P projecting rearwardly from the under side of the plate or casting I are a series of levers Q, one for each operating-key and its corresponding punch. The rear ends of these levers are pivoted to the upper ends of links R, whose lower ends are pivoted to the sides of the key-levers A just in front of the fulcrum-shaft B of said key-levers, while the forward ends of said levers Q bear against the under sides of the heads of the punches M. It results from this construction that whenever the front of any key-lever A is depressed it will carry down the rear end of its connected lever Q, and the front end of the latter will lift the punch against which it bears and force the latter through the slot J and the coincident hole above it.

In using the machine the proprietor or cashier will place the customer's ticket upon the shelf K, with its edge in the slot J, with the number to be punched in line with the key representing such number, and then depress the front end of such key. This will cause the number on the ticket to be punched out and the registering-wheel operated by that key to be turned forward one number and register the transaction. If the customer's ticket contains no number representing the exact amount of his purchase, the proprietor will punch out as many numbers as may be necessary, in the same manner.

My invention is not restricted, in its broader scope, to the details of construction herein illustrated and described, but contemplates the combination, in a cash-register, of a series of operating-keys representing different values, a registering mechanism actuated thereby to register their respective values, and a series of punches actuated by the respective keys and co-operating with suitable dies, for the purpose described.

Having thus fully described my invention, I claim—

1. The combination, in a cash register, of a series of key levers representing different values, each having upon its front end a finger button bearing a number indicating its value, a registering mechanism actuated by said key levers to register their different values, by which upon operating one key lever one amount will be added upon the registering mechanism and upon operating other key levers other amounts will be added upon it, and a series of punches arranged in front of the fulcrum of said key levers, in position to have printed checks inserted from the front of the machine in place to be acted on by the punches, said punches being actuated by the respective key levers and adapted to punch out of the printed checks numbers corresponding to those upon the finger buttons of the respective levers, whereby a registration of all amounts may be made and preserved by the mere operation of punching out the numbers upon the checks, substantially as and for the purpose described.

2. The combination, in a cash register, of the series of pivoted key levers A having upon their front ends numbered buttons representing different values, a registering mechanism actuated thereby to register their respective values, the plate I provided with the projecting shelf K, transverse slots J and bores L, the punches M fitting in said bores and adapted to pass through holes in the plate I transversely of the slot J, and means intermediate said punches and the respective key levers for moving the punches through the slot and holes, substantially as and for the purpose described.

3. The combination, in a cash register, of the series of operating key levers A representing different values, the individual registering wheels E, the actuating pawls F carried by the key levers and co-operating with the registering wheels, the plate I provided with the projecting shelf K, slots J and bores L, the punches M provided with enlarged heads N fitting within the bores L and adapted to pass through holes in the plate I transversely of the slot J, and the coiled springs O surrounding the punches M between their heads N and the upper ends of the bores L, the levers Q co-operating with the punches M, and the links R connecting the levers Q with the key levers A, substantially as described.

GEORGE W. GROVE.

Witnesses:
  THOMAS CORWIN,
  F. A. L. SNECKNER.